Sept. 6, 1966   G. E. ADAMS ET AL   3,270,402
WHEEL MANUFACTURE
Filed Nov. 5, 1963   5 Sheets-Sheet 1
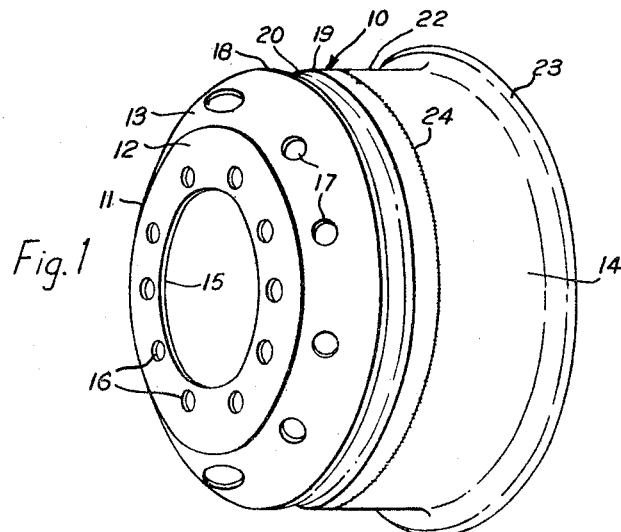
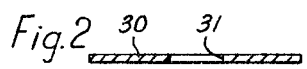
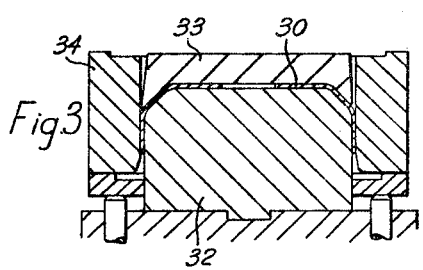
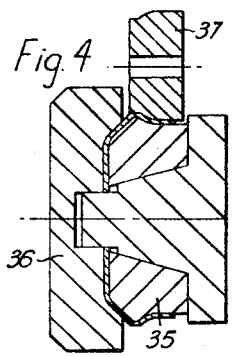
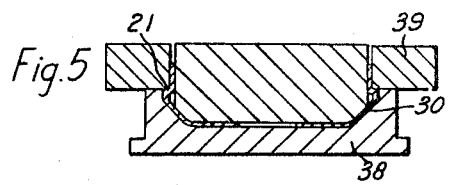
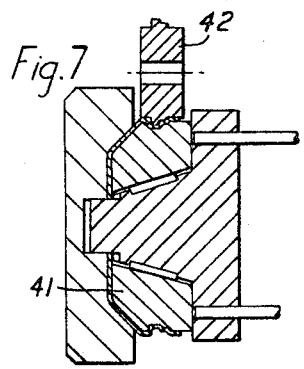
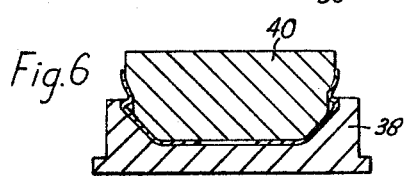

Sept. 6, 1966　　　G. E. ADAMS ET AL　　　3,270,402
WHEEL MANUFACTURE

Filed Nov. 5, 1963　　　　　　　　　　　　　　5 Sheets-Sheet 2

Inventors:
George Edward Adams
George Henry Whale
John Harry Arthur Hanson
by Benj. T. Rauber
attorney

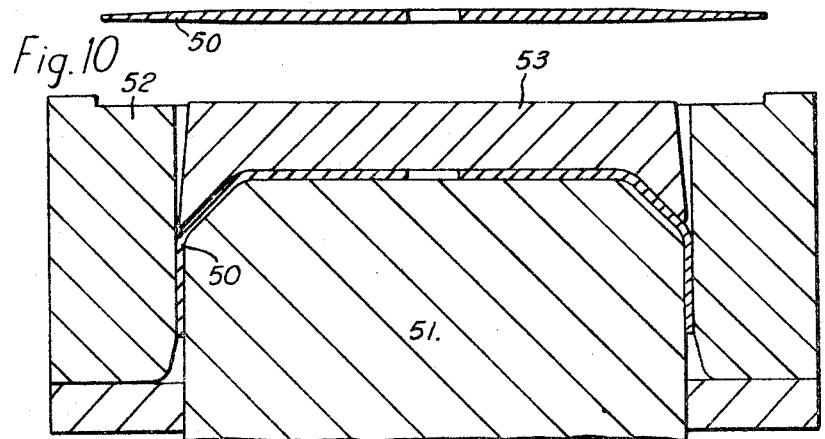
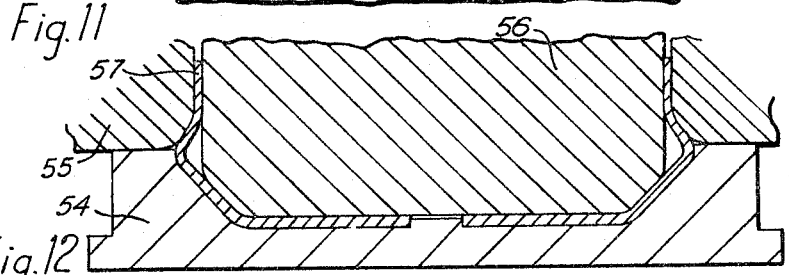
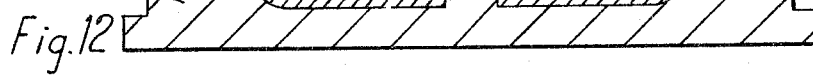
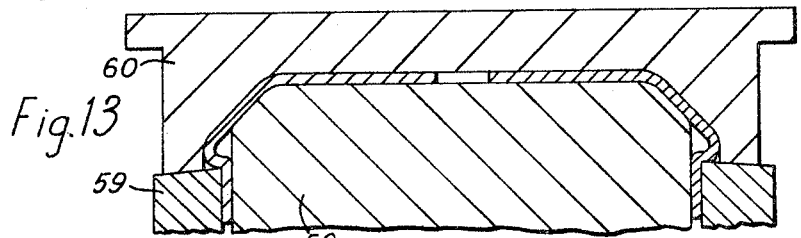
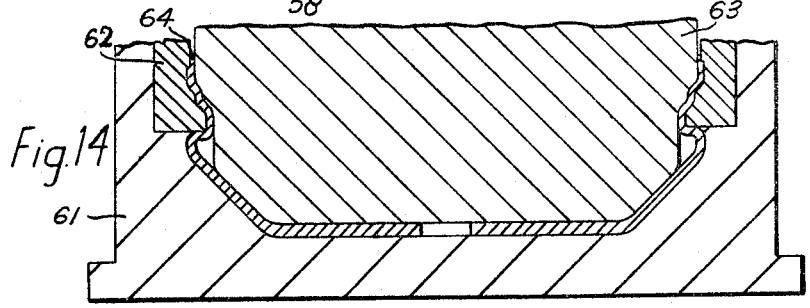

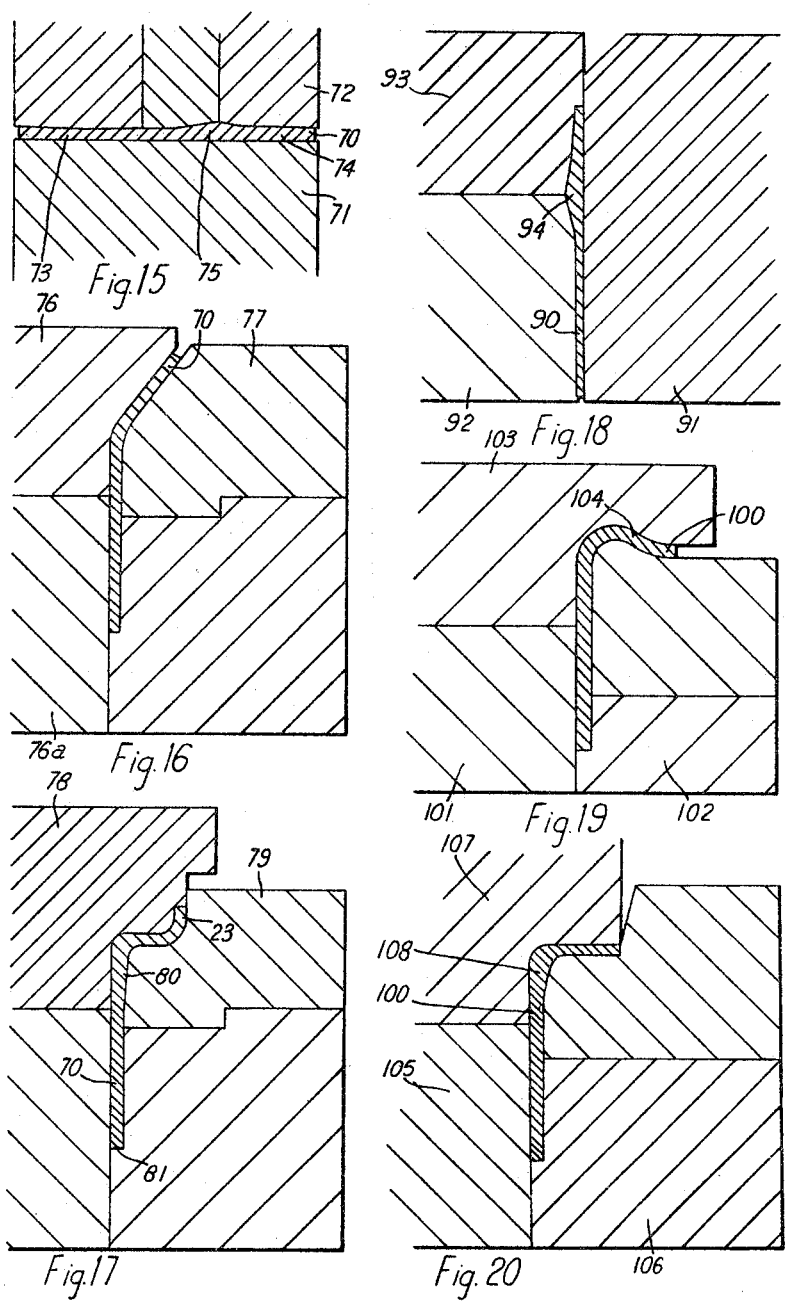

Sept. 6, 1966 G. E. ADAMS ET AL 3,270,402
WHEEL MANUFACTURE
Filed Nov. 5, 1963 5 Sheets-Sheet 5

Inventors:
George Edward Adams
George Henry Whale
John Harry Arthur Hanson
by Benj. T. Rauber
attorney

United States Patent Office 3,270,402
Patented Sept. 6, 1966

3,270,402
WHEEL MANUFACTURE
George Edward Adams and George Henry Whale, Coventry, and John Harry Arthur Hanson, New Cubbington, near Leamington Spa, England, assignors to Dunlop Rubber Company Limited, London, England, a British company
Filed Nov. 5, 1963, Ser. No. 321,453
Claims priority, application Great Britain, Nov. 7, 1962, 42,017/62
5 Claims. (Cl. 29—159.01)

This invention relates to metal wheels for pneumatic tyres and particularly to methods of manufacturing said wheels.

A conventional metal wheel suitable for commercial load-carrying vehicles or passenger service vehicles comprises a rim to seat a pneumatic tyre and an annular disc attached to one edge of the rim by, e.g., welding or rivetting. The rim is constructed from a length of hot rolled steel strip having a cross-section which incorporates a fixed tyre-retaining flange at one end thereof and a gutter at the other end. When the length is circled and the ends joined to form the rim the gutter extends circumferentially around it adjacent one edge and is then adapted to contain either a split retaining flange for a tyre in the case of a two-piece rim or a split locking ring for a flange in the case of a three-piece rim. The disc, which is usually dished, is joined to the edge of the rim adjacent the gutter.

When a length of strip having this cross-section is forced to take on a circular form with its ends abutting, the portion between the tyre flange and the gutter generally takes on a conical form instead of a cylindrical one. This is undesirable and the rim has to undergo other operations to restore the correct diameters appropriate to the different parts of the rim.

Distortion difficulties due to welding of the abutting ends of the rim after circling and due to welding of the disc to the rim require further corrective operations to ensure that the finished wheel and in particular the gutter conform to existing commercial tolerances.

The object of the present invention is to provide a method of manufacturing a wheel which avoids the necessity of joining a separate rim and disc to form a complete wheel, thus providing a wheel having a rim and disc portion formed together as a seamless unitary structure.

According to the invention, a method of manufacturing a wheel having a load-supporting disc and at least a part of a rim formed together as a seamless unitary structure from a single metal blank comprises subjecting a disc-shaped blank to a series of pressing operations to shape the outer peripheral portion of the blank to form at least part of a wheel rim.

The invention does not include with its scope a method for the production of a wheel from a metal billet by a series of *forging* operations, in which a relatively thick billet is heated and forged between dies to cause the material of the billet to flow into the desired shape: the present invention is concerned with the production of wheels from sheet metal, and introduces the novel concept of forming a sheet metal disc by *pressing* operations into a wheel disc, or body, portion which is integral with at least part of the wheel rim. Thus the thickness of the metal blank used in the pressing method according to the invention is substantially equal to the thickness of the disc portion of the finished wheel, in contrast to a method in which a wheel is *forged* from a metal billet which is originally of considerably greater thickness than the thickness of the disc portion of the finished wheel.

The wheel may be produced by a combination of pressing and rolling operations, alternatively it may be produced wholly by pressing operations.

For example, the disc-shaped blank may be formed to a cup-shape by pressing, the cup-shaped blank then being mounted on a rotatable forming roller which grips the interior of the blank and co-operates with a second rotatable forming roller gripping the outer surface of the blank to roll a circumferentially-extending gutter in the blank. The forming rollers are provided with complementary profiles to produce the desired gutter profile.

The interior-forming roller may be expansible to the interior diameter of the cup-shaped blank to grip the inner surface thereof, or alternatively an interior-forming roller of smaller diameter than the interior diameter of the blank may be used.

When an expansible forming roller is used to grip the inner surface of the blank the rolling operation can be carried out by moving the expansible former horizontally so that the outer surface of the blank carried thereon is moved tangentially beneath a profiled roller supported on an axle at a fixed height above the plane in which the axis of the expansible former is moved. This operation may be used to provide a gutter having a profile intermediate in shape between the profile of the rough blank and the desired final profile, the final profile then being produced by further horizontal movement of the expansible former towards a second profiled roller supported on an axle at the same height as the axle of the expansible former. Thus a two-stage rolling process can be carried out by a continuous unidirectional movement of the expansible former.

Only part of the rim may be formed integrally with the disc portion, the remaining part of the rim, which includes a fixed tyre-retaining flange, being formed separately and welded to the integral disc and rim part along a circumferential line in the central region of the rim.

Alternatively, the blank may be shaped by the pressing operations so that it forms a complete wheel having a circumferentially-extending gutter in the region of the junction between the disc portion and the rim and a fixed tyre-retaining flange at the side of the rim remote from said junction.

The invention also provides a wheel manufactured by any of the methods defined above. The wheel manufactured in accordance with the invention has an important advantage over the conventional type of wheel in that there is no point constituting a weakness in the highly-stressed region of the junction between disc portion and rim; in the case where the rim is formed from two parts, the joint between the parts is in the comparatively low-stressed central region of the rim. Also, a wheel can be produced by a method in accordance with the invention more cheaply and with more accurate control of the dimensions and shape of the wheel.

The invention will now be described with reference to the accompanying drawings, in which:

FIGURE 1 is a perspective view of a wheel produced by a method in accordance with the invention, the detachable flange and lock ring having been removed;

FIGURES 2–7 are axial cross-sectional views showing the steps of one method of making part of a wheel of the kind shown in FIGURE 1;

FIGURES 10–14 show the steps of an alternative method to that shown in FIGURES 2–7;

FIGURES 15–17 are scrap axial cross-sectional views which show the steps of a method for forming part of a wheel rim from a cylindrical band of metal having an original thickness equal to that of the thickest portion of the finished rim part;

FIGURE 18 shows a preliminary step to the operations shown in FIGURES 16 and 17 when a band having an original thickness equal to that of the thinnest portion of the finished rim part is used;

FIGURES 19 and 20 show alternative preliminary steps in the method shown in FIGURES 15–17 for producing part of a wheel rim from a band having an original thickness equal to that of the thinnest portion of the finished rim;

Figure 8:
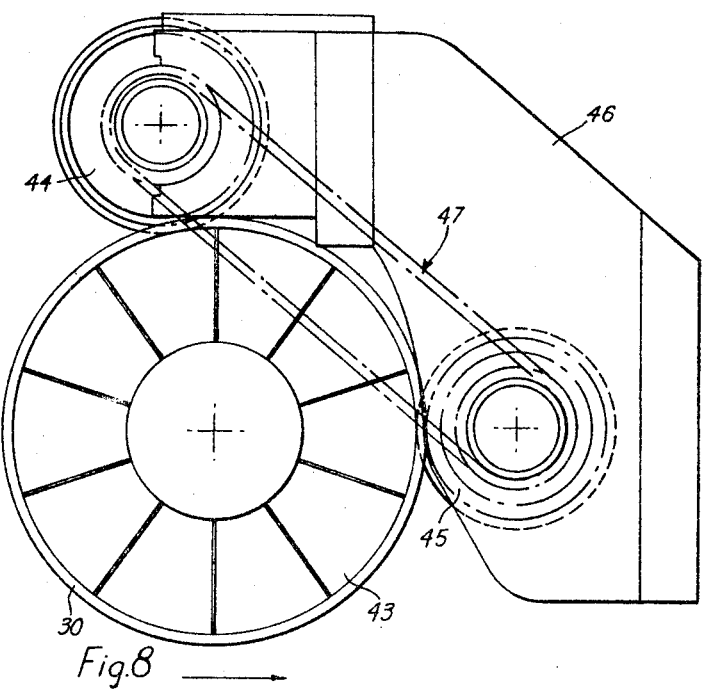
FIGURE 8 shows a suitable apparatus for carrying out the step shown in FIGURE 7.

A wheel 10, in accordance with the invention, for use on a commercial vehicle comprises a generally dish-shaped disc 11 having centrally a plane radially-extending portion 12 and radially outwardly thereof a frusto-conical portion 13 merging into the rim 14. The disc 11 is formed with an opening 15 at its centre, so that it will pass over an axle end, and a series of mounting holes 16 positioned on a pitch circle radially outwardly of the central opening.

Apertures 17 are formed in the frusto-conical portion of the disc for the purpose of reducing the weight of the wheel and for ventilating a brake which may be positioned in the wheel.

The frusto-conical portion 13 flows smoothly and homogeneously into a portion 18 which extends axially away from the outer periphery of the frusto-conical portion of the disc in the same axial direction to join the disc portion to a rim part 19 which is thus formed as a seamless unitary structure with the disc portion 11, the thickness of the metal forming the frusto-conical portion 13 and the rim part 19 being substantially uniform. The axially-extending portion 18 is formed with an indented profile, in the region of the junction between the disc portion and the rim part, such that a circumferentially-extending gutter 20 is provided to accommodate a conventional locking ring (not shown) for locating a detachable tyre bead-retaining flange (also not shown) in position. The axially outer wall 21 (see FIGURE 9) of the gutter thus formed is sloped slightly in a direction so that its radially outer region is nearer to the central portion of the rim than the region adjacent to the base of the gutter, to provide an effective means for holding the locking ring against axially outward pressure. The metal forming the portion 18 of indented profile has substantially the same thickness as that of the remaining portions of the rim.

The rim part 19 terminates at a position where another rim part 22 comprising a short cylinder having a tyre retaining flange 23 at one end is joined to it by a welded joint 24. The joint 24 is positioned in the rim so that it lies in a plane situated between the tyre-retaining flanges of the completed wheel.

According to one embodiment of the invention, the integrally-formed disc and rim part of the wheel described above is manufactured by the following method.

A blank 30 (see FIGURE 2) in the form of a steel disc having a circular central opening 31 is formed by a two-stage pressing operation into a cup-shape, the second stage of the pressing operation being shown in FIGURE 3. As shown in FIGURE 3, the cup-shaped blank 30 is supported on a central die part 32, and shaped by axial movement of die parts 33 and 34.

The blank 30 is then removed from the press, heated, mounted on an expansible forming roller 35 (see FIGURE 4) and clamped on the roller 35 by an appropriately shaped die 36. A second rotatable forming roller 37, mounted on a fixed axle, is then brought into contact with the outer periphery of the blank 30 by horizontal movement of the expansible roller 35, to form the rim portion of the blank to a profile intermediate between that of the blank as shown in FIGURE 3 and the desired final profile.

A second hot pressing operation is then carried out, as shown in FIGURE 5, the blank 30 being pressed between dies 38 and 39 which form the axially outer wall 21 of the lock ring gutter. The rim portion of the blank is then bulged outwardly by a second die 40, as shown in FIGURE 6.

The final operation of forming the rim portion of the blank to the desired profile is performed by heating and rolling the blank as shown in FIGURE 7, the required profile being formed on the co-operating rollers 41 and 42 and the operation being carried out as previously described with reference to FIGURE 4.

An alternative method and apparatus for rolling the gutter profile into the blank is shown in FIGURE 8. The cup-shaped blank 30 is gripped by an expanding roll 43 which is rotatably supported on a horizontally movable saddle (not shown). Two profiled forming rollers 44 and 45 are supported on a machine frame 46 and drivably connected together by a chain and sprocket drive 47, one of the rollers being driven by an electric motor (not shown). The rolling operation is performed by moving the blank tangentially beneath the roller 44 to part-form the desired profile and continuing to move the blank until it contacts the roller 45 to complete the rolling operation in one unidirectional movement. A method and apparatus of this kind can be used for either of the operations illustrated in FIGURES 4 and 7.

Figure 9:
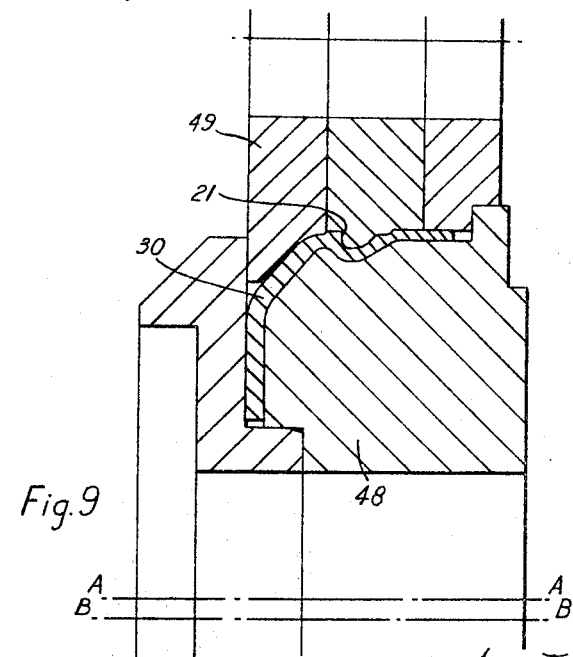
FIGURE 9 shows an alternative method of carrying out the step shown in FIGURE 7.

FIGURE 9 shows an alternative apparatus, for rolling the rim profile of the blank, in which a solid roller 48 of smaller diameter than the blank 30 is used to support the blank. The axis of the roller 48 is represented by the line A—A and the axis of the blank by the line B—B. The blank is supported between the roller 48 and a second profiled forming roller 49 and the rollers are rotated to form the blank to the required profile.

FIGURES 10–14 show an alternative method of producing the integrally-formed disc and rim part of the wheel according to the invention.

The disc-shaped blank 50 shown in FIGURE 10 has been formed by rolling so that its radially outer regions are reduced in thickness relative to its radially inner regions, the outside diameter of the disc thus being increased.

The blank 50 is formed to cup-shape by a cold pressing operation (see FIGURE 11) between dies 51, 52 and 53 which shape the radially inner portions of the blank into the disc portion and frusto-conical portion of the finished wheel, the outer portion of the blank being formed into an axially-extending portion merging with the outer periphery of the frusto-conical portion.

The next step is a cold pressing operation (see FIGURE 12) between dies 54, 55, 56 which reduce the outside diameter of the part 57 of the axially-extending portion of the blank remote from the disc portion to the diameter required for the base of the gutter.

A hot pressing operation is then carried out (see FIGURE 13) between dies 58, 59, 60 which form the wall of the gutter nearer to the disc, i.e. the axially-outer wall of the gutter, into its desired final shape, that is, sloping slightly in a direction so that its radially-outer region is nearer to the central portion of the finished rim than the region adjacent the base of the gutter.

A final hot pressing operation (see FIGURE 14) between dies 61, 62, 63 then forms the remaining parts of the axially-extending portion to the desired profile. The edge 64 of the axially-extending portion remote from the disc portion is rebated, the rebate being accurately finished by a turning operation, to enable a lap joint to be formed between the rim part produced by the method described above and a second rim part, produced by a method to be described, to form the complete rim. The die 62 is transversely split to allow the finished wheel components to be removed.

FIGURES 15–17 illustrate one method of producing the second rim part 22 (see FIGURE 1) of the finished wheel. In this method, a cylindrical blank in the form of a band 70 having a thickness equal to that of the thickest portion of the finished second rim part is first rolled between profiled rollers 71 and 72 to produce a blank in which the axially outer regions 73, 74 are of reduced thickness relative to a region 75 intermediate the outer regions. The blank is then formed by two stages of pressing operations, between dies 76, 76a and 77 as shown in FIGURE 16 and between dies 78 and 79 as shown in FIGURE 17, into an annulus of approximately L-shaped cross-section having the required profile to constitute the second rim part, the thicker region of the blank providing the bead-seating portion 80 and the radially inner region of the flange 23 of the second rim part.

The second rim part is then rebated at the edge 81 to be joined to the axially-extending portion of the wheel part described above. The two parts are joined and welded together around both the radially outer and inner surfaces of the joint between the parts.

FIGURE 18 shows a preliminary step which is required when the operations shown in FIGURES 16 and 17 are performed on a band 90 having a thickness equal to the minimum thickness of the finished rim part. In this instance the band 90 is first heated and pressed between dies 91, 92 and 93 to provide the required thickened portion 94. The subsequent operations to form the finished rim part are as shown in FIGURES 16 and 17.

An alternative method for forming the second rim part from a cylindrical blank having a thickness equal to the thickness of the thinnest portion of the second rim part is shown in FIGURES 19 and 20. After a preliminary shaping operation similar to that shown in FIGURE 16, the blank 100 is pressed between dies 101, 102, 103 which form one outer edge of the blank into a radially outwardly projecting curved flange 104. The blank 100 is then heated in the region of the junction between the flange and the axially-extending part, and is pressed between dies 105, 106, 107 (see FIGURE 20) which serve to compress the heated part in the axial direction and which define between them an annular channel of suitable profile to produce a thickened region 108 of the blank to form a bead seat. This operation also serves to thicken the radially inner region of the flange where it joins the bead seat region 108. The rim part is then formed to the desired final profile by further rolling or pressing operations, or by both rolling and pressing operations.

Figure 21:
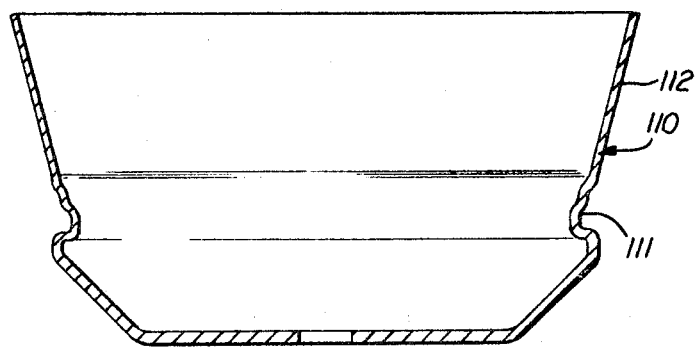
FIGURES 21–23 show the steps of an alternative method in which a complete wheel is formed from a single metal blank.
Figure 22:
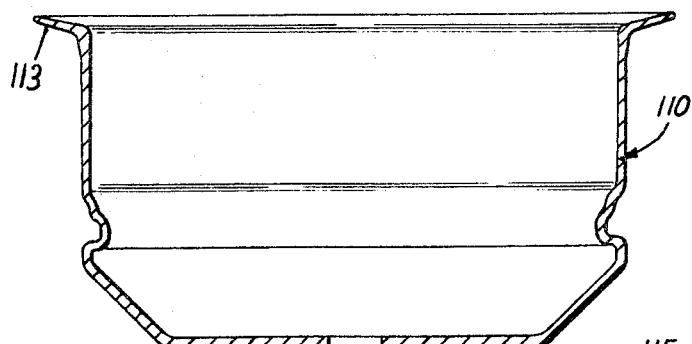
Figure 23:
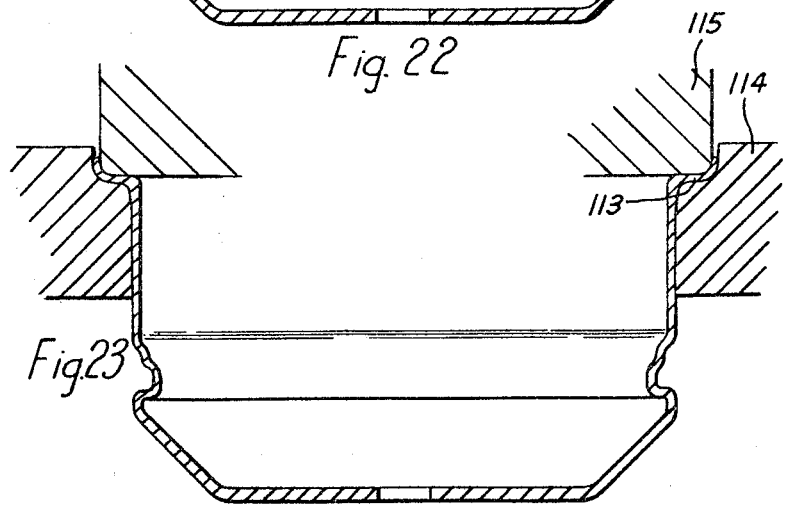

In an alternative method shown in FIGURES 21–23, in which the entire wheel is formed from a single blank 110, the blank is first formed by pressing a disc to a cupshape, having the gutter region 111 fully formed, by one of the methods described above (see FIGURE 21). An axially-extending portion 112 is formed from the blank and is of sufficient axial length and maximum diameter so that it can be shaped, after the operations described above to form the remaining portions of the wheel have been carried out, to provide the whole of the rim part extending beyond the gutter, including the fixed tyre-retaining flange 23. FIGURE 22 shows the state of the blank after a flow turning operation, which finishes the major portion of the rim but leaves the fixed flange roughly formed as a lip 113. FIGURE 23 shows a final cold pressing operation between dies 114 and 115 to form the lip 113 to its required shape as a tyre-retaining flange.

Having now described our invention, what we claim is:

1. Method of making a wheel having a load supporting disc part and a rim part as a seamless unitary structure which comprises pressing a substantially flat disc shaped blank by pressing operations to shape the radially outward zone of the blank to form the rim part, rolling the portion of the rim remote from the disc portion to a reduced diameter, pressing the reduced diameter portion of the rim axially toward the disc portion to form the axially outer surface of a lock-ring gutter adjacent to the disc portion, expanding the reduced diameter portion of the rim radially outwardly from said gutter wall and rolling the rim against a profile roller to its final rim and gutter form.

2. A method according to claim 1 wherein the blank is supported for a rolling operation on a former of smaller diameter than the interior diameter of the blank.

3. A method according to claim 1 wherein rolling operations are carried out by mounting the blank on an expansible former.

4. A method according to claim 3 wherein the first rolling operation is carried out by moving the expansible former so that the outer surface of a blank carried thereon is moved tangentially with respect to a profiled roller.

5. A method according to claim 4 wherein the tangential movement of the blank relative to the profiled roller provides a gutter having a profile intermediate in shape between the profile of the rough blank and the desired final profile, the final profile then being produced by further movement of the expansible former towards a second profiled roller.

References Cited by the Examiner

UNITED STATES PATENTS

| 1,838,892 | 12/1931 | Vis | 72—353 |
| 2,075,294 | 3/1937 | Le Jeune | 29—159.01 |
| 2,080,866 | 5/1937 | Lobdell | 29—159.1 |
| 2,086,488 | 7/1937 | Batie | 29—159.01 X |
| 2,736,674 | 2/1956 | Harmon | 29—159.01 X |

JOHN F. CAMPBELL, *Primary Examiner.*

THOMAS H. EAGER, *Examiner.*